Patented Sept. 17, 1935

2,015,023

UNITED STATES PATENT OFFICE 2,015,023

SULPHONATION OF ROSIN AND ITS DERIVATIVES

Henry J. Weiland, South Milwaukee, and Milton A. Prahl, Milwaukee, Wis., assignors to E. I. du Pont de Nemours & Company, Wilmington, Del., a corporation of Delaware No Drawing. Application February 15, 1934, Serial No. 711,443

4 Claims. (Cl. 260—108)

This invention relates to the preparation of water-soluble sulphonation products of rosin and its derivatives.

It is known that rosin and many of its derivatives such as hydrogenated rosin, ester gum, ethyl abietate or hydro abietate, and other rosin esters, particularly when in a fairly pure form, are difficult to sulphonate by the methods heretofore used, and in those cases where sulphonation does occur, the yields of water-soluble product are poor. In many cases chlorosulphonic acid has been found to give better results than sulphuric acid monohydrate, although even with chlorosulphonic acid the yields of sulphonation products, measured by their wetting ability, are not satisfactory. The use of oleum of varying degrees concentration gives results similar to monohydrate.

It is an object of this invention to provide an improved process for sulphonating rosin of various grades, hydrogenated rosin, ester gums, abietic or hydroabietic acid and their esters, abietene, abietane, etc., whereby the yields of water-soluble sulphonation products may be materially increased.

This object is accomplished by introducing sulphur trioxide into a solution of rosin or its derivatives in an inert solvent, preferably in the absence of water, at temperatures below 20° C. and in the absence of substantial quantities of sulphuric acid. The resulting product is readily isolated by diluting and neutralizing the mass, steam distilling out the solvent and evaporating the aqueous solution to dryness. High grade rosin which cannot be successfully sulphonated by other methods, with this process gives good yields of a water-soluble sulphonation product. Abietene, which though capable of being sulphonated with 100% sulphuric or with chlorosulphonic acid with fair yields, gives by this new process a yield of wetting agent, based on wetting out efficiency of the standardized product, twice as great as heretofore obtained. Abietane, which by the prior methods does not sulphonate satisfactorily unless carefully fractionated and freed from the lower boiling impurities, may be sulphonated without purification by this process, and gives high yields of a water-soluble product.

The following examples are given to more fully illustrate our invention. Parts used are by weight.

Example 1

128 parts of vacuum distilled abietene and 512 parts of tetrachlorethane, contained in a flask, are cooled to 0° C. and thoroughly stirred. Sulphur trioxide vapor obtained by gradual distillation from 200 parts of 60% oleum is slowly introduced into the sulphonation mixture while maintaining the temperature at 0° C. The distillation of the sulphur trioxide is continued over a period of 2 to 3 hours by gradually raising the temperature of the flask containing the oleum until 80 parts of sulphur trioxide have been introduced into the reaction mixture, as is evinced by loss of weight from the oleum flask or gain in weight of the reaction mixture. The distillation is then discontinued. The stirring of the mixture at 0° C. is continued for 1½ hours longer. 600 parts of cold water are then added, followed by the addition of 33% sodium hydroxide solution until the stirred mixture is neutral. About 50 parts of sodium hydroxide (in 33% solution) will be required. 1 part of calcium carbonate and 10 parts of filter aid (filter cell) are added, and the mixture is distilled until the inside temperature is 100°, and 502 parts of tetrachlorethane have distilled over. From the distillate the tetrachlorethane is recovered by the usual methods and may be used after purification. The aqueous solution of the sulphonated product is then filtered, evaporated to dryness and pulverized.

230 parts of a water-soluble yellow powder are obtained.

Example 2

131 parts of abietane are sulphonated exactly as in Example 1, except that the filter-aid is omitted and the filtration step may be dispensed with.

230 parts of a pale yellow powder are obtained. The product is easily soluble in water. It possesses foaming, emulsifying, and dispersive properties, and is a more powerful wetting agent than the abietene sulphonate.

If desired, the product may be freed from sodium sulphate by extraction with hot alcohol or benzene, followed by filtration and evaporation of the solution. The desirable properties of the product are enhanced by this purification; the product is completely soluble, not only in water, but also in alcohol, benzene, tetrachlorethane, etc.

Example 3

128 parts of abietene and 512 parts of tetrachlorethane are mixed and sulphonated exactly as outlined in Example 1, except that instead of 80 parts of sulphur trioxide, 120 parts are introduced. 300 parts of 60% oleum will be necessary to furnish this quantity of sulphur trioxide.

After the sulphonation has been completed, the mass is diluted with 900 parts of water, neutralized with sodium hydroxide solution, and distilled until no more tetrachlorethane distills over. The sulphonate solution is filtered and evaporated to dryness, and the product pulverized.

288 parts of a water-soluble yellow powder are obtained. The product is an excellent assistant for vegetable tanning.

*Example 4*

131 parts of abietane are treated exactly as in the case of Example 3, but the filtration step may be omitted.

288 parts of a water-soluble yellow powder are obtained. The product is also an excellent assistant for vegetable tanning.

*Example 5*

151 parts of N gum rosin are dissolved in 800 parts of tetrachlorethane and sulphonated by the procedure described in Example 1, using 120 parts of sulphur trioxide obtained from 300 parts of 60% oleum.

The sulphonation mass is diluted with 1200 parts of water, neutralized with a base and freed from tetrachlorethane by distillation. After cooling, the clear liquor is decanted from the mass of insoluble material and evaporated to dryness.

255 parts of a yellow powder are obtained. The product is readily soluble in water and functions as a foaming and emulsifying agent.

*Example 6*

151 parts of hydrogenated rosin are sulphonated exactly as in Example 5. A similar product is obtained.

In the manner described in Example 5, ester gum, hydrogenated ester gum, ethyl abietate, etc., have been sulphonated and products similar to the one described in Example 5 have been obtained.

The amount of sulphur trioxide may be varied over wide limits depending upon the type of product desired. In the case of abietene and abietane, approximately 2 moles of sulphur trioxide for every mole of hydrocarbon is the optimum ratio if maximum wetting power is desired. The use of greater amounts of sulphur trioxide with abietene and abietane yields excellent tanning assistants which possess reduced wetting properties. The sulphur trioxide may be introduced in gas, liquid or solid form, or it may be first dissolved in the tetrachlorethane and this solution may be used as the sulphonating agent.

The amount of tetrachlorethane may be varied over wide limits; the ratio of solvent to hydrocarbon may, if desired, be reduced to 1:1. When these small amounts of solvent are used the reaction is usually not as smooth, and darker products may result; however, in cases where very low priced products are wanted, it is often desirable to use much smaller amounts of tetrachlorethane than those mentioned in the examples.

The products may be worked up in other ways than those described in the examples. For instance if a solution rather than a dry product is desired, the evaporation step may be omitted; if the free sulphonic acid rather than the sodium salt is desired, the acid solution after removal of the tetrachlorethane may be used as such or it may be evaporated to obtain the free acid in the form of a paste. Potassium or ammonium salts may also be prepared.

The manner in which sulphur trioxide reacts with the rosin derivatives is not thoroughly understood, and the position of the resulting sulphonic acid or sulphuric acid ester groups is unknown.

Other solvents than those mentioned in the examples may of course be used in this process, so long as they are inert under the conditions of the reaction and are liquid at the temperatures used. The temperatures at which the sulphonation is carried out may vary up to about 20° C., although temperatures of below about 5° C. are preferred, for higher temperatures darken the product and tend to distil out sulphur trioxide.

It will of course be obvious to those skilled in the art that various modifications and changes may be made in the invention as above described without departing from the spirit of our invention or the scope of the appended claims.

We claim:

1. In the sulphonation of a compound of the group consisting of rosin, hydrogenated rosin, abietic acid, hydroabietic acid and their esters, abietene and abietane, the step which comprises carrying out the sulphonations with sulphur trioxide in the absence of any substantial quantity of sulphuric acid.

2. In the sulphonation of rosin and its derivatives, the step which comprises reacting a compound of the group consisting of rosin, hydrogenated rosin, abietic acid, hydroabietic acid and their esters, abietene and abietane, in an inert solvent with sulphur trioxide in the absence of any substantial quantity of sulphuric acid.

3. In the sulphonation of rosin and its derivatives, the step which comprises reacting a compound of the group consisting of rosin, hydrogenated rosin, abietic acid, hydroabietic acid and their esters, abietene and abietane, in an inert solvent with sulphur trioxide in the absence of any substantial quantity of sulphuric acid, at temperatures below about 5° C.

4. In the sulphonation of rosin, the step which comprises reacting it with sulphur trioxide in an inert solvent at temperatures of below 20° C.

HENRY J. WEILAND.
MILTON A. PRAHL.